United States Patent [19]

Allard et al.

[11] Patent Number: 5,265,542
[45] Date of Patent: Nov. 30, 1993

[54] MOTION CONTROL APPARATUS

[76] Inventors: Gene R. Allard, R.R. 1, Box 2760; David D. Allard, R.R. 1, Box 2795, both of, Rapid City, S. Dak. 57702

[21] Appl. No.: 687,378

[22] Filed: Apr. 18, 1991

[51] Int. Cl.[5] .......................................... A47B 11/00
[52] U.S. Cl. ...................... 108/138; 108/146; 248/410
[58] Field of Search ............ 108/146, 143, 148, 138; 248/410, 316.2, 231.3

[56] References Cited

U.S. PATENT DOCUMENTS

| | | | |
|---|---|---|---|
| 381,040 | 4/1888 | Stuck | 248/410 |
| 836,303 | 11/1906 | Christensen | 248/410 X |
| 1,235,613 | 8/1917 | Vandergrift | 248/410 |
| 1,372,456 | 3/1921 | Roetter | 248/410 |
| 2,062,371 | 12/1936 | Musser . | |
| 2,392,477 | 1/1946 | Holm | 108/146 |
| 2,449,424 | 9/1948 | Stieber . | |
| 2,637,113 | 5/1953 | Kroenlein . | |
| 2,637,313 | 5/1953 | White | 248/410 X |
| 3,188,986 | 6/1965 | La Vigne | 108/146 X |
| 3,313,190 | 4/1967 | Bothum . | |
| 3,314,384 | 4/1967 | Mann et al. | 108/146 |
| 3,395,692 | 8/1968 | Johns | 248/410 X |
| 3,539,142 | 11/1970 | Morand . | |
| 3,588,023 | 6/1971 | Cohen | 248/410 |
| 3,893,730 | 7/1975 | Homier et al. . | |
| 4,163,536 | 8/1979 | Heller et al. . | |
| 4,607,577 | 8/1986 | Leonardo | 248/410 X |
| 4,634,320 | 1/1987 | Itzov . | |

Primary Examiner—Jose V. Chen
Attorney, Agent, or Firm—Joseph J. Kelly

[57] ABSTRACT

Motion control apparatus is provided for permitting movement of a slidable member in one direction relative to a fixed support while releasably preventing movement in the opposite direction or for releasably preventing movement of the slidable member in either direction using one or more locking arms pivotally mounted on the slidable member and resiliently urged into the locking position with a release rod slidably mounted on the slidable member to overcome the resilient urging to permit sliding movement of the slidable member. Also, movement preventing apparatus is provided to hold at least one locking arm in a non-locking location.

27 Claims, 3 Drawing Sheets

1

MOTION CONTROL APPARATUS

FIELD OF THE INVENTION

This invention relates generally to the control of relative sliding motion between two articles and more particularly to apparatus for permitting or preventing relative movement between a relatively fixed support and a slidable member.

BACKGROUND OF THE INVENTION

In many instances, it is desirable to control the relative movement between two articles by permitting or preventing the movement of one article relative to the other. One such instance is described in U.S. Pat. No. 4,949,650 to Allard which is incorporated herein by reference thereto. In this patent, one part of a table top is moved relative to a fixed support and the other part of the table top for various purposes. For some purposes, it is desirable to have apparatus to permit a slidable member to be moved in one direction by simply applying a force thereto but to prevent movement automatically in the opposite direction. For other purposes, it is desirable to prevent movement of the slidable member until desired. In all instances, it is desirable that the movement or nonmovement be accomplished as easily and economically as possible.

BRIEF DESCRIPTION OF THE INVENTION

This invention provides motion control apparatus which permits movement of a slidable member relative to a fixed support by the application of pressure thereto but releasably prevents movement of the slidable member in the opposite direction. The motion control apparatus also releasably prevents movement of a slidable member in opposite directions relative to a fixed support. Additional means are provided for permitting movement of a slidable member in one of the two opposite directions while preventing movement of the slidable member in the opposite one of the two opposite directions.

In one preferred embodiment of the invention the motion control apparatus comprises at least one relatively fixed support and at least one slidable member mounted for sliding movement thereover. Releasable locking means are provided for preventing the sliding movement of the at least one slidable member. Control means are provided for releasing the locking means to permit movement of the at least one slidable member. The releasable locking means comprise at least one rod mounted at a fixed location on the at least one support and having a longitudinal axis. At least one locking arm is pivotally mounted on the at least one slidable member for movement therewith and having at least one opening formed therein with the opening having at least one sidewall. The at least one opening has a transverse cross-sectional area greater than the transverse cross-sectional area of the at least one rod so that the locking arm may slide over the at least one rod. Resilient means are provided for urging at least a portion of the at least one sidewall into contact with at least a portion of the at least one rod to prevent relative movement between the at least one locking arm and the at least one rod. The resilient means are designed to prevent the relative movement only in one direction. The control means comprise at least one release rod. Mounting means are provided for mounting the at least one release rod on the at least one slidable member for movement therewith and for movement relative thereto. Force applying means are provided for applying a force on the at least one locking arm to overcome the resilient means to permit relative movement between the at least one locking arm and the at least one rod. The force applying means comprise a lever arm; a first pivot means for pivotally mounting the lever arm on the at least one slidable member; and a second pivot means for pivotally connecting one end of the lever arm to one end of the at least one release rod so that movement of the lever arm moves the at least one release rod to apply the force on the at least one locking arm. Counter-balancing means are provided for counter-balancing the weight of the at least one slidable member. The force applying means apply either a pushing force or a pulling force on the at least one locking arm. The transverse cross-sectional configurations of the at least one rod and the at least one opening are cylindrical.

In another preferred embodiment of the invention, the releasable locking means include at least a pair of locking arms which are pivotally mounted on the at least one slidable member and each of them has at least one opening formed therein which opening has at least one sidewall. The at least one opening has a transverse cross-sectional configuration greater than the transverse cross-sectional configuration of the at least one rod to permit sliding movement of the at least a pair of locking arms over the at least one rod. Resilient means are provided for urging at least a portion of each of the at least one sidewalls into contact with spaced apart portions of the at least one rod to prevent relative movement between the at least a pair of locking arms and the at least one rod. The control means for releasing the locking means include at least one release rod. First mounting means are provided for mounting the at least one release rod on the at least one slidable member for movement therewith and for movement relative thereto. Force applying means are provided for applying a force to one of the at least a pair of locking arms to overcome the resilient means to permit relative movement between the one of the at least a pair of locking arms and the at least one rod in one direction or for applying a force on the other of the at least a pair of locking arms to overcome the resilient means to permit relative movement between the other of the at least a pair of locking arms and the at least one rod in the opposite direction. The force applying means include at least one elongated rod. Mounting means are provided for mounting the elongated rod on the at least one slidable member for movement relative thereto for applying the force to the one or the other of the at least a pair of locking arms. Movement of the at least one elongated rod in one direction applies a pulling force on the one of the at least a pair of locking means and movement of the at least one elongated rod in the opposite direction applies pushing force on the other of the at least a pair of locking arms. The at least a pair of locking arms have inwardly facing surfaces and outwardly facing surfaces and the pulling or pushing force is applied to one or the other of the outwardly facing surfaces or the inwardly facing surfaces. Movement preventing means are provided for preventing movement of the one or the other of the at least a pair of locking arms in response to the resilient means or the force applying means. The movement preventing means include at least one additional elongated rod; additional mounting means for mounting the at least one additional elongated rod on the at least one slidable member for movement therewith and for movement between a first movement permitting location and a second movement permitting location and holding means for holding the at least one additional elongated rod at either of the first or the second movement permitting locations.

BRIEF DESCRIPTION OF THE DRAWINGS

Illustrative and presently preferred embodiments of the invention are in the accompanying drawings in which.

DETAILED DESCRIPTION OF THE INVENTION

Figure 1:
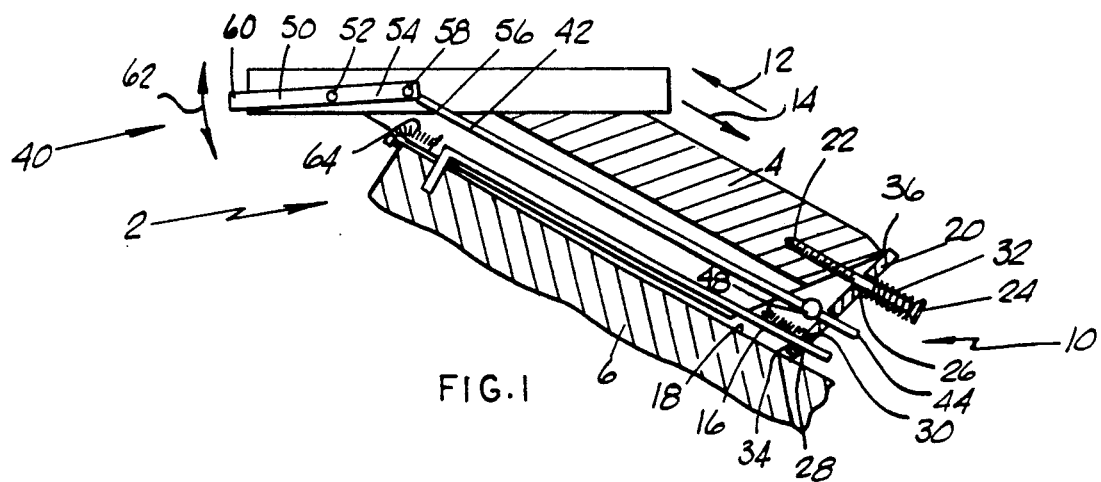
FIG. 1 is a side elevational view with parts in section of a portion of a preferred embodiment of the invention.
Figure 2:
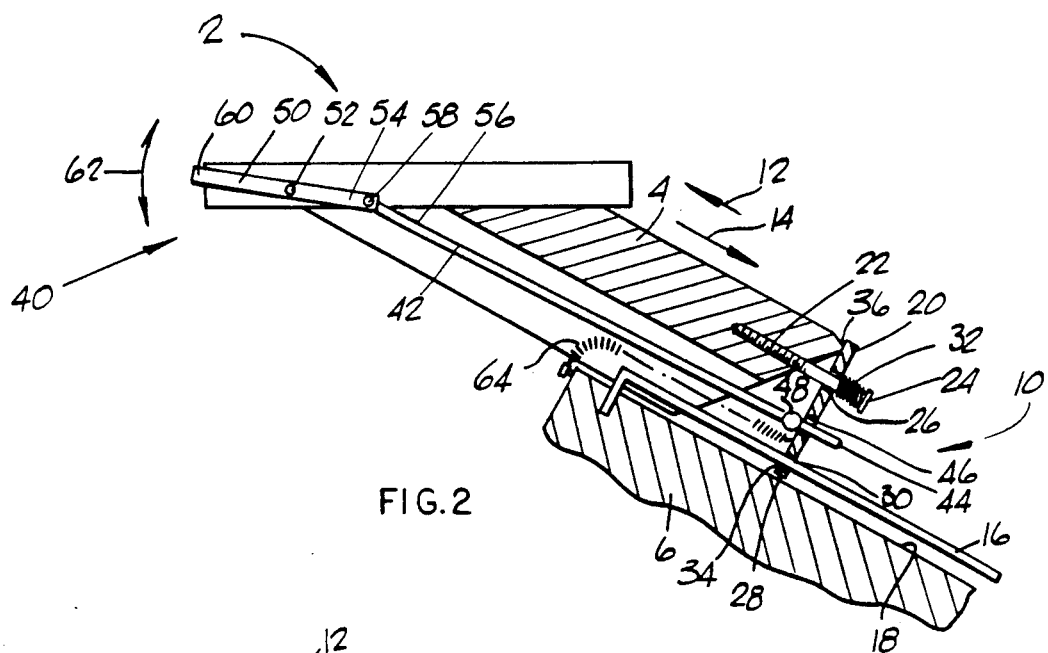
FIG. 2 is a side elevational view similar to FIG. 1 with the member moved to a different location.

In FIGS. 1 and 2, there is illustrated apparatus 2 for permitting sliding movement of a slidable member 4 over a relatively fixed support 6. The at least one slidable member 4 and the relatively fixed support 6 can be of any desired cross-sectional configuration and can be used singly or in conjunction with other slidable members 4 and relatively fixed supports under varying circumstances. One such type of apparatus, capable of using apparatus of this invention, is illustrated in the above-identified Allard patent.

Releasable locking means 10 are provided for permitting movement of the at least one slidable member 4 in the direction indicated by the arrow 12 by the application of force to the at least one slidable member 4 but preventing movement of the at least one slidable member 4 in the direction indicated by the arrow 14. The releasable locking means 10 comprise at least one rod 16 mounted on the relatively fixed support 6 but spaced from an adjacent surface 18 thereof. At least one locking arm 20 is pivotally mounted on the slidable member 4 for movement therewith by a threaded screw 22 having an enlarged head portion 24 which threaded screw passes through an opening 26 in the locking arm 20. The opening 26 has a cross-sectional configuration larger than the threaded screw 22 to allow for the pivotal movement of the locking arm 20. The locking arm 20 has another opening 28 formed therein and the at least one rod 16 passes through the another opening 28. The another opening 28 has an internal sidewall 30 having a transverse cross-sectional configuration greater than the transverse cross-sectional configuration of the at least one rod 16 so that the at least one locking arm 20 may be moved to a location to permit the at least one locking arm 20 to be moved relative to the at least one rod 16 (as illustrated in FIG. 2). Resilient means 32, such as a coiled spring, are located between the head portion 24 and the opening 26 to urge the portion of the at least one locking arm 20 having the another opening 28 toward the at least one slidable member 4. As illustrated in the drawings, the pivotal axis of the locking arm 20 is the line contact 36 between the locking arm 20 and the slidable member 4. As a result of this, a portion 34 of the internal sidewall 30 moves into contact with a portion of the at least one rod 16 to prevent movement of the at least one slidable member 4 in the direction indicated by the arrow 14 (as illustrated in FIG. 1). If a force is applied to the at least one slidable member 4 in the direction indicated by the arrow 12, the force of the resilient means 32 will be overcome so that the at least one locking arm 20 will pivot to the location illustrated in FIG. 2 and permit the at least one locking arm 20 to slide over the at least one rod 16. The transverse cross-sectional configurations of the at least one rod 16 and the internal sidewall 30 can be of any shape but preferably are cylindrical.

Control means 40 are provided to release the at least one locking arm 20 from the locking position to permit movement of the at least one slidable member 4 in the direction indicated by the arrow 14. The control means comprise at least one release rod 42 having an end portion 44 passing through an opening 46 in the at least one locking arm 20. A fixed projection 48 on the at least one release rod 42 is located so that it can be moved into contact with the portions of the at least one locking arm 20 surrounding the opening 46 to apply a force to the at least one locking arm 20 to overcome the resilient means 32 and permit sliding movement of the at least one locking arm 20 over the at least one rod 16.

At least one lever arm 50 is pivotally mounted on the at least one slidable member 4 by pivot means 52. One end portion 54 is pivotally connected to the end portion 56 of the at least one release rod 42 by the pivot means 58. The other end portion 60 is located so that a force may be applied thereto so that the other end portion 60 can move in the directions indicated by the arrows 62. As illustrated in FIG. 1, the resilient means 32 will apply a force on the at least one locking arm 20 to move it against the fixed projection 48 to move the at least one lever arm 50 to the position illustrated in FIG. 1 so that movement of the at least one slidable member 4 in the direction indicated by the arrow 14 is prevented. When it is desired to move the at least one slidable member 4 in the direction indicated by the arrow 14, a force is applied to the other end portion 60 to move it from the location illustrated in FIG. 1 to the location illustrated in FIG. 2. The movement of the at least one lever arm 50 transmits a force against the at least one locking arm 20 to move it into the location illustrated in FIG. 2 so that the slidable member 4 can be moved in the direction indicated by the arrow 14. In FIGS. 1 and 2, the force applied to move the at least one locking arm 20 to the unlocked location is a pushing force. A counterbalancing means 64, such as a coiled spring, is provided to overcome the weight of the at least one slidable member 4. As illustrated in FIG. 1, the coiled spring is connected at one end to the fixed support 6 and at the other end to the locking arm 20 so that, in addition to the counterbalancing function, it also adds an additional force to hold the locking arm 20 in the locked position.

Figure 3:
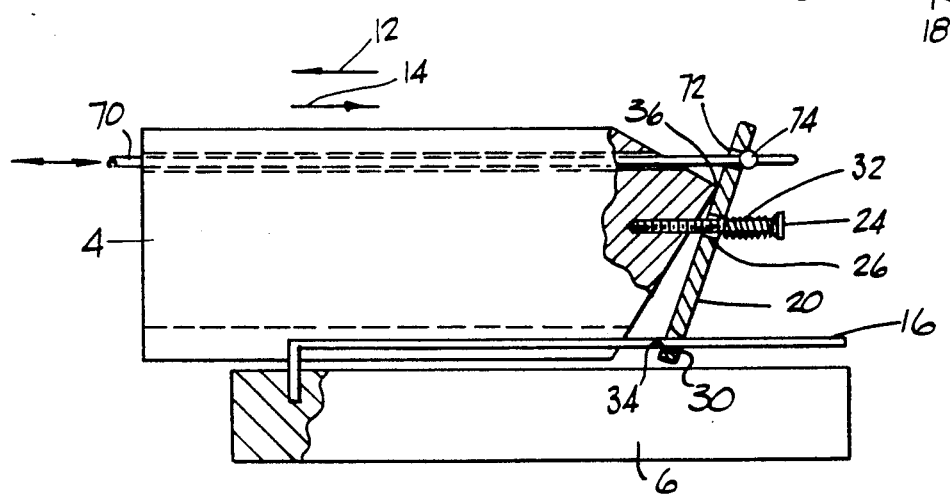
FIG. 3 is a side elevational view with parts in section of a portion another preferred embodiment of the invention.

The apparatus illustrated in FIG. 3 is similar to that in FIGS. 1 and 2 and corresponding parts have been given the same reference numerals. In FIG. 3, the control means to release the at least one locking arm 20 from the locking position comprise a release rod 70 mounted for sliding movement through the at least one movable member 4 and passing through an opening 72 in the at least one locking arm 10 and a fixed projection 74 is located to contact the portion of the at least one locking arm 20 surrounding the opening 72 to apply a force thereto to overcome the force of the resilient means 32. As illustrated in FIG. 3, the at least one slidable member 4 can move in the direction indicated by the arrow 12 but cannot move in the direction indicated by the arrow 14. When it is desired to move the at least one slidable member 4 in the direction indicated by the arrow 14, a force is applied to the release rod 70 to move it in the direction of the arrow 12 so that the fixed projection 74 pivots the at least one locking arm 20 to a location similar to the illustrated in FIG. 2 so that the at least one slidable number 4 can be moved in the direction indicated by the arrow 14. The fixed projection 74 applies a pulling force on the at least one locking arm 20 to pivot it.

Figure 4:
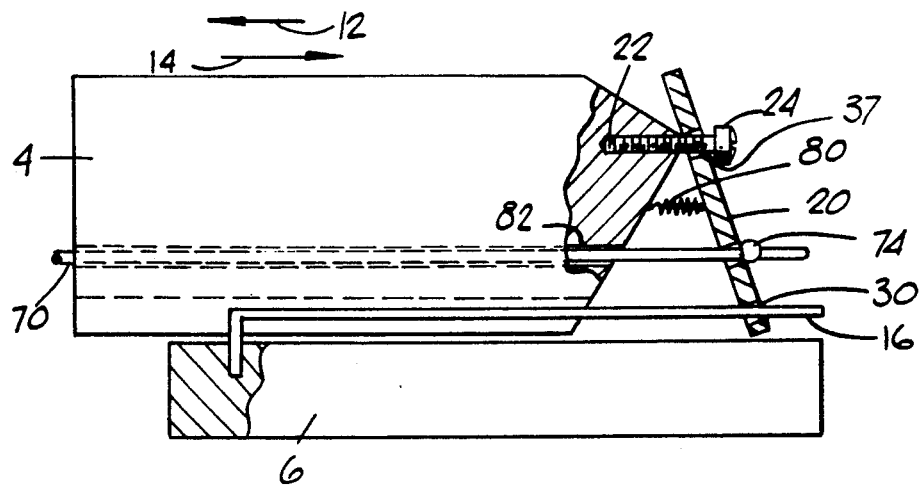
FIG. 4 is a side elevational view with parts in section of another preferred embodiment of the invention.
Figure 5:
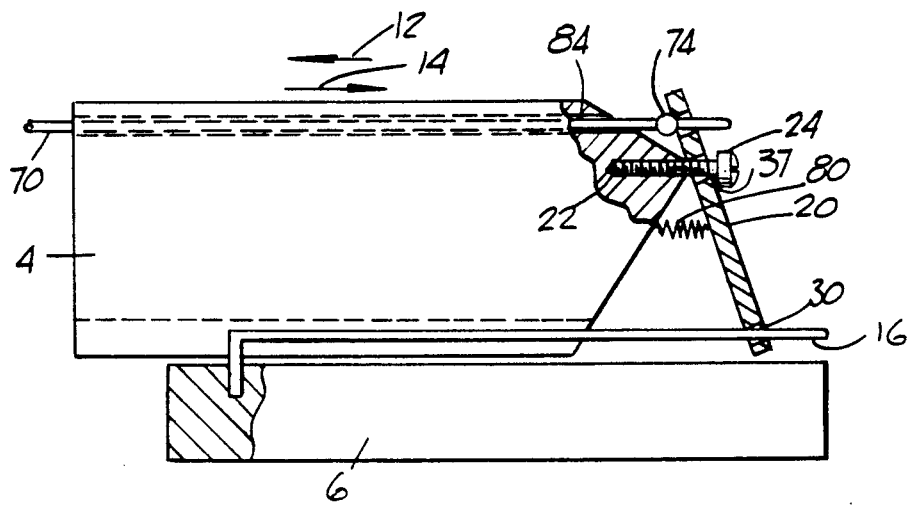
FIG. 5 a side elevational view with parts in section of another embodiment of the invention.

The apparatuses illustrated in FIGS. 4 and 5 are similar to that illustrated in FIGS. 1-3 and corresponding parts have been given the same reference numerals. The major difference in FIGS. 4 so that the pivotal axis of the locking arm 20 is the line contact 37 between the locking arm 20 and the screw head 24 and 5 is that the resilient means 80 apply a force to urge the portion of the at least one locking arm 20 having the internal sidewall 30 in the direction away from the at least one slidable member 4. In FIG. 4, to unlock the at least one slidable member 4, a force is applied to the release rod 70 to move it through a passageway 82 in the at least one slidable member 4 in the direction of the arrow 12 to apply a pulling force to pivot the at least one locking arm 20 to the unlocked position illustrated in FIG. 2. In FIG. 5, the fixed projection 74 is located so that when the release bar 70 is moved through a passageway 84 in the at least one slidable member 4 in the direction indicated by the arrow 14, it applies a pushing force on the at least one locking arm 20 to pivot it to the unlocked position illustrated in FIG. 2.

Figure 6:
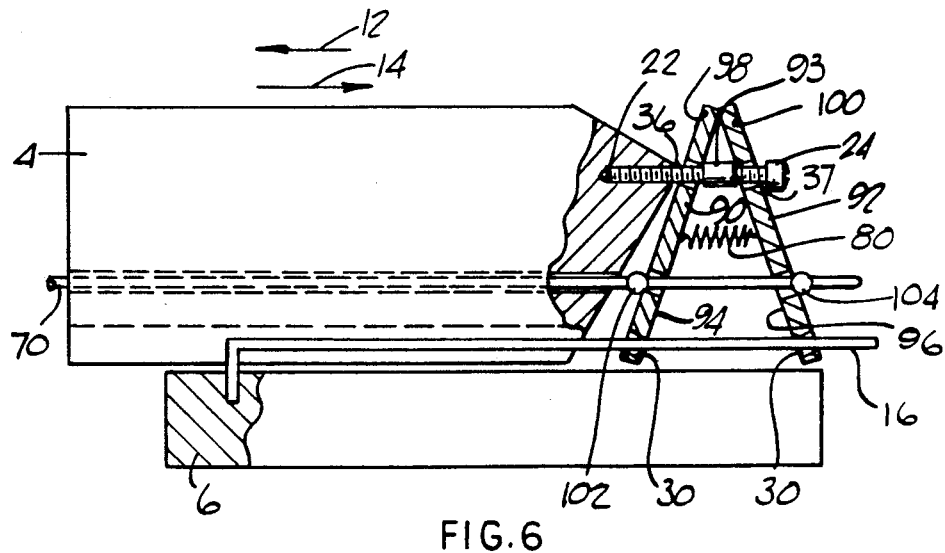
FIG. 6 is a side elevational view with parts in section of another embodiment of the invention.
Figure 7:
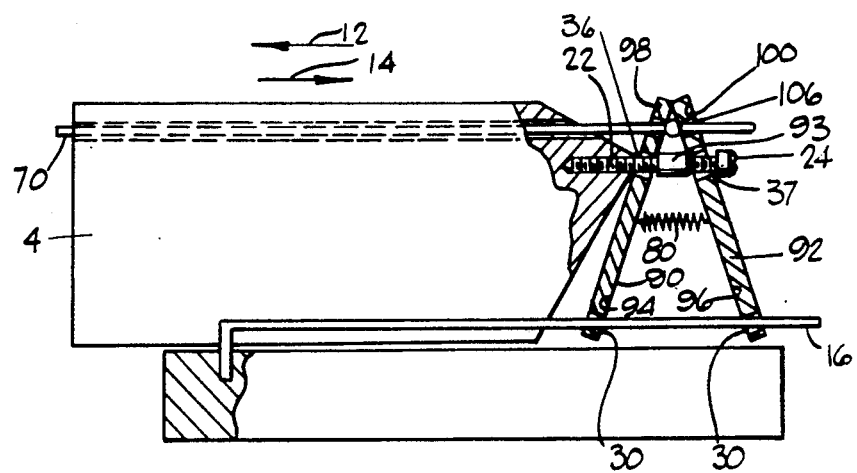
FIG. 7 is a side elevational view with parts in section of another embodiment of the invention.

The apparatus illustrated in FIGS. 6 and 7 is generally similar to the apparatus illustrated in FIGS. 1-5 and corresponding parts have been given the same reference numerals. In FIGS. 6 and 7, there are at least a pair of locking arms 90 and 92 pivotally mounted on the threaded screw 22. The at least a pair of locking arms 90 and 92 have internal surfaces 94 and 96 and external surfaces 98 and 100. The resilient means 80 urge the at least a pair of locking arms 90 and 92 in directions away from each other so that movement of the at least one slidable member 4 in either of the directions indicated by the arrows 12 and 14 is prevented. Fixed projections 102 and 104 are located on the release rod 70 so that movement of the release rod 70 in the direction indicated by the arrow 14 results in a pushing force being exerted by the fixed projection 102 on the external surface 98 to pivot the locking arm 90 to the unlocked position and movement of the release 70 in the direction of the arrow 12 results in a pulling force being exerted by the fixed projection 104 on the external surface 100 to pivot the locking arm 92 to the locking position so that the at least one slidable member 4 can be selectively moved in one of two opposite directions. In FIG. 7, the fixed projection 106 is located between the internal surfaces 94 and 96, so that movement of the release rod 70 in the direction of the arrow 12 results in a pulling force being exerted by the fixed projection 106 on the internal surface 94 to pivot the locking arm 90 to the unlocked position and movement of the release rod 70 in the direction indicated by the arrow 14 results in a pushing force being applied by the fixed projection 106 on the internal surface 96 to pivot the locking arm 92 to the unlocked position so that the at least one slidable member 4 can be selectively moved in one of two opposite directions.

Figure 8:
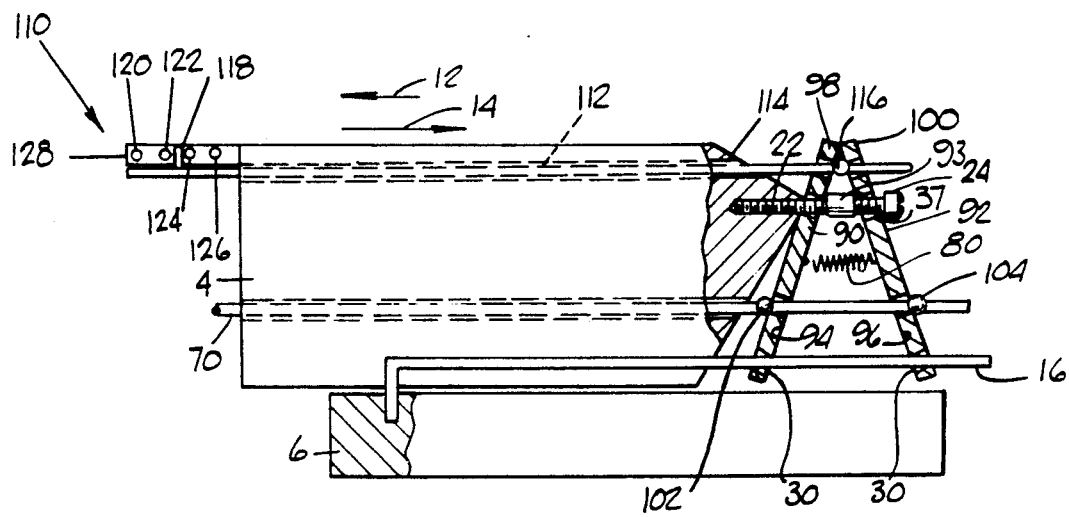
FIG. 8 is a side elevational view with parts in section of another embodiment of the invention.
Figure 9:
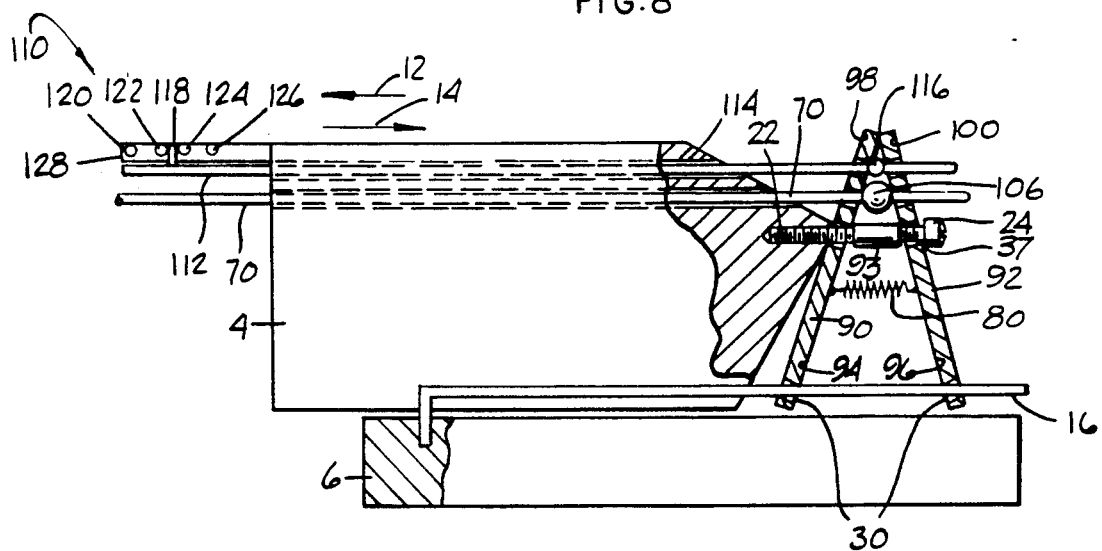
FIG. 9 is a side elevational view with parts in section of another preferred embodiment of the invention.

The apparatus illustrated in FIGS. 8 and 9 is similar to the apparatus in FIGS. 6 and 7 and corresponding parts have been given the same reference numerals. In FIGS. 8 and 9, movement preventing means 110 have been added so that either of the at least a pair of locking arms may be moved and retained at the unlocked position or they can function as illustrated in FIGS. 6 and 7. The movement preventing means 110 comprise an elongated rod 112 which is mounted for sliding and rotational movement in a passageway 114 in the at least one slidable member 4. A fixed projection 116 is on the elongated rod 112 and is located between the internal surfaces 94 and 96. The elongated rod 112 has a projecting finger 118 and spaced apart fixed pins 120, 122, 124 and 126 are mounted on a support plate 128 secured to the at least one slidable member 4. In operation, when the finger 118 of the elongated rod 112 is located between pins 122 and 124, the apparatus functions the same as the apparatus in FIGS. 6 and 7. When the finger 118 is located between the pins 120 and 122, the fixed projection 116 has applied a pushing force on the internal surface 94 to pivot the locking arm 90 to the unlocked position. When the finger 118 is between the pins 120 and 122, the apparatus functions the same as the apparatus in FIGS. 4 and 5. The pins 120 and 122 will prevent sliding movement of the elongated rod 112 to hold the locking arm 90 in the unlocked position. If the elongated rod 112 is rotated to move the finger 118 from between the pins 120 and 122 and the elongated rod is moved in the direction of the arrow 14, the fixed projection 116 will apply a pushing force on the internal surface 96 to pivot the locking arm 92 to the unlocked position while the resilient means 80 returns the locking arm 90 to the locking position. When the finger 118 is between the pins 124 and 126, the apparatus functions the same as the apparatus in FIGS. 1-3. The elongated rod 112 is rotated to move the finger 118 between the pins 124 and 126 to prevent sliding movement thereof. The arrangement in FIGS. 8 and 9 provides many different ways of controlling the movement of the at least one slidable member 4.

While an illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. Motion control apparatus comprising:
    at least one support;
    at least one slidable member mounted for sliding movement over said at least one support;
    releasable locking means for preventing said sliding movement of said at least one slidable member;
    control means for releasing said locking means to permit said sliding movement of said at least one slidable member;
    wherein said releasable locking means comprise:

at least one rod mounted on said at least one support and having a longitudinal axis;

at least one locking arm mounted on said at least one slidable member for movement therewith and having at least one opening formed therein;

said at least one opening having at least one sidewall;

pivot means for mounting said locking arm for pivotal movement around a pivotal axis;

said at least one opening having a transverse cross-sectional area greater than the transverse cross-sectional area of said at least one rod;

at least a portion of said at least one rod being located in said at least one opening;

resilient means for urging at least a portion of said at least one sidewall into contact with at least a portion of said at least one rod to prevent relative movement between said at least one locking arm and said at least one rod;

said control means being located between said pivotal axis and said at least one opening.

2. The invention as in claim 1 wherein:
said resilient means preventing said relative movement only in one direction.

3. The invention as in claim 2 wherein said control means comprises:
at least one release rod;
mounting means for mounting said at least one release rod on said at least one slidable member for movement therewith and for movement relative thereto; and
force applying means for applying a force on said at least one locking arm to overcome said resilient means to permit relative movement between said at least one locking arm and said at least one rod.

4. The invention as in claim 3 wherein said force applying means comprise:
a lever arm;
second pivot means for pivotally mounting said lever arm on said at least one slidable member; and
third pivot means for pivotally connecting one end of said lever arm to one end of said at least one release rod so that movement of said lever arm moves said at least one release rod to apply said force on said at least one locking arm.

5. The invention as in claim 3 and further comprising:
counterbalancing means for counterbalancing the weight of said at least one slidable member.

6. The invention as in claim 3 wherein:
said force applying means apply a pushing force on said locking arm.

7. The invention as in claim 3 wherein:
said force applying means apply a pulling force on said locking arm.

8. The invention as in claim 3 wherein:
said transverse cross-sectional configurations of said at least one rod and said at least one opening are cylindrical.

9. The invention as in claim 3 wherein:
said resilient means applying a force on said at least one locking arm to urge said at least one opening in a direction toward said at least one slidable member.

10. The invention as in claim 9 wherein said control means comprise:
at least one release rod;
first mounting means for mounting said at least one release rod on said at least one slidable member for movement therewith and for movement relative thereto; and force applying means for applying a force to one of said at least a pair of locking arms to overcome said resilient means to permit relative movement between said one of said at least a pair of locking arms and said at least one rod in one direction or for applying a force on the other of said at least a pair of locking arms to overcome said resilient means to permit relative movement between said other of said at least a pair of locking arms and said at least one rod in the opposite direction.

11. The invention as in claim 3 wherein:
said resilient means applying a force on said at least one locking arm to urge said at least one opening in a direction away from said at least one slidable member.

12. The invention as in claim 1 wherein said releasable locking means comprise:
at least one rod mounted at a fixed location on said at least one support;
at least a pair of locking arms pivotally mounted on said at least one slidable member;
each of said at least a pair of locking arms having at least one opening formed therein;
said at least one opening having at least one sidewall;
said at least one opening having a transverse cross-sectional configuration greater than the transverse cross-sectional configuration of said at least one rod;
at least a portion of said at least one rod being located in each of said at least one openings; and
resilient means for urging at least a portion of each of said at least one sidewalls into contact with spaced apart portions of said at least one rod to prevent relative movement between said at least a pair of locking arms and said at least one rod.

13. The invention as in claim 12 and further comprising:
movement preventing means for preventing movement of said one or said other of said at least a pair of locking arms in response to said resilient means or said force applying means.

14. The invention as in claim 13 wherein said movement preventing means comprises:
at least one elongated rod;
additional mounting means for mounting said at least one elongated rod on said at least one slidable member for movement therewith and for movement relative thereto and between at least a first movement preventing location and a second movement preventing location; and
holding means for holding said at least one elongated rod at either of said first or said second movement preventing locations.

15. The invention as in claim 14 wherein said motion control means comprise:
at least one release rod;
first mounting means for mounting said at least one release rod on said at least one slidable member for movement therewith and for movement relative thereto; and
force applying means for applying a force to one of said at least a pair of locking arms to overcome said resilient means to permit relative movement between said one of said at least a pair of locking arms and said at least one rod in one direction or for applying a force on the other of said at least a pair of locking arms to overcome said resilient means to permit relative movement between said other of said at least a pair of locking arms and said at least one rod in the opposite direction.

16. The invention as in claim 10 wherein said force applying means comprise:
   at least one elongated rod; and
   second mounting means for mounting said elongated rod on said at least one slidable member for movement relative thereto for applying said force to said one or said other of said at least a pair of locking arms.

17. The invention as in claim 16 wherein:
   movement of said at least one elongated rod in one direction applies a pulling force on said one of said at least a pair of locking arms; and
   movement of said at least one elongated rod in the opposite direction applies a pushing force on said other of said at least a pair of locking arms.

18. The invention as in claim 17 wherein:
   said at least a pair of locking arms have inwardly facing surfaces and outwardly facing surfaces; and
   said pulling or pushing force is applied to one or the other of said outwardly facing surfaces.

19. The invention as in claim 17 wherein:
   said at least a pair of locking arms have inwardly facing surfaces and outwardly facing surfaces; and
   said pulling or pushing force is applied to one or the other of said inwardly facing surfaces.

20. Motion control apparatus comprising:
   at least one relatively fixed support;
   at least one slidable member mounted for sliding movement over said at least one support;
   releasable locking means for preventing said sliding movement of said at least one slidable member;
   control means for releasing said locking means to permit said sliding movement of said at least one slidable member;
   wherein said releasable locking means comprise:
      at least one rod mounted on said at least one support and having a longitudinal axis;
      at least one locking arm mounted on said at least one slidable member for movement therewith and having at least one opening formed therein;
      said at least one opening having at least one sidewall;
      pivot means for mounting said locking arm for pivotal movement around a pivotal axis;
      said at least one opening having a transverse cross-sectional area greater than the transverse cross-sectional area of said at least one rod;
      at least a portion of said at least one rod being located in said at least one opening;
      resilient means for urging at least a portion of said at least one sidewall into contact with at least a portion of said at least one rod to prevent relative movement between said at least one locking arm and said at least one rod;
      said resilient means being located between said pivotal axis and said at least one opening said control means are located between said resilient means and said at least one opening.

21. The invention as in claim 20 and further comprising:
   additional resilient means for applying an additional force to urge said at least a portion of said at least one sidewall into contact with said at least a portion of said at least one rod to prevent relative movement between said at least one locking arm and said at least one rod.

22. The invention as in claim 21, wherein:
   said additional resilient means also applying a counterbalancing force to counterbalance said at least one slidable member.

23. The invention as in claim 20 wherein said pivotal axis comprises:
   line contact between said movable member and said locking arm.

24. The invention as in claim 20 wherein said pivot means comprise:
   a first inclined generally planar surface on said at least one slidable member;
   a second inclined generally planar surface on said at least one slidable member and intersecting said first inclined generally planar surface to form a line of intersection;
   said locking arm having at least a second opening formed therein;
   securing means passing through said at least a second opening and secured to said at least one slidable member;
   stop means on said securing means;
   said resilient means being located between said at least a second opening and said stop means to urge a portion of said locking arm into contact with said line of intersection.

25. The invention as in claim 24 wherein:
   said at least a second opening having a cross-sectional configuration of said securing means to provide for said pivotal movement of said locking arm.

26. The invention as in claim 25 and further comprising:
   additional resilient means for applying an additional force to urge said at least a portion of said at least one sidewall into contact with said at least a portion of said at least one rod to prevent relative movement between said at least one locking arm and said at least one rod.

27. The invention as in claim 26 wherein:
   said additional resilient means also applying a counterbalancing force to counterbalance said at least one slidable member.

* * * * *

UNITED STATES PATENT AND TRADEMARK OFFICE
CERTIFICATE OF CORRECTION

PATENT NO. : 5,265,542
DATED : November 30, 1993
INVENTOR(S) : Allard, et al

It is certified that error appears in the above-indentified patent and that said Letters Patent is hereby corrected as shown below:

Column 2, line 12, delete "Counter-balancing" and insert therefor --Counterbalancing--.
Column 2, line 57, delete "applies pushing" and insert therefor --applies a pushing--.
Column 3, line 15, delete "the member" insert therefor --the slidable member--.
Column 3, line 21, delete "5a" and insert therefor --5 is a--.
Column 3, line 24, delete "another embodiment" and insert therefor --another preferred embodiment--.
Column 8, line 56, delete "motion".
Column 10, line 43, after "configuration" insert therefor --larger than the cross-sectional configuration--.

Signed and Sealed this

Twelfth Day of July, 1994

Attest:

BRUCE LEHMAN

*Attesting Officer*  *Commissioner of Patents and Trademarks*